Patented Oct. 30, 1951

2,572,877

UNITED STATES PATENT OFFICE 2,572,877

METHOD OF ADHERING VINYL RESIN SURFACES

Thomas C. Morris, Lexington, and Eric C. Johnson, Somerville, Mass., assignors to B. B. Chemical Co., Boston, Mass., a corporation of Massachusetts No Drawing. Application August 1, 1946, Serial No. 687,700

12 Claims. (Cl. 154—140)

This invention relates to securing vinyl resin bodies to surfaces of base materials which may or may not be of vinyl resin, and particularly relates to providing a finish or surfacing sheet of vinyl resin on a non-vinyl resin base.

Vinyl resin materials, for example, the materials known as "Vinylite" (plasticized copolymers of vinyl chloride and vinyl acetate, the material known as "Koroseal" (plasticized polymerized vinyl chloride), the materials known as "Geon" (plasticized vinyl chloride and vinylidene chloride copolymers), and the material known as "Saran" (polymerized vinylidene chloride), are particularly desirable as surface materials because of their luster and fine appearance. Also, they are flexible, elastic and resistant to abrasion and scratching. The materials are waterproof and easily cleaned.

Notwithstanding the desirability of providing vinyl resinous surfaces on base materials, numerous applications of vinyl resin sheets have been found impracticable because of the difficulty encountered in securing the vinyl resin sheets in position. Because of the tendency of the vinyl resin sheet to tear, sewing or nailing of a vinyl resin sheet is often not a satisfactory method of securing the sheet in place.

It has hitherto been proposed to secure vinyl resin sheet by means of solvent type cements. However, organic solvents frequently cause wrinkling, curling, distortion, or blistering of the vinyl resin material.

It is an object of the invention to form a strongly adherent coating of a butadiene-acrylonitrile copolymer on the surface of a vinyl resin body.

It is another object of this invention to provide a new method for adhering a vinyl resin material to a surface of another body of material.

It is a still further object of the invention to provide a new method for adhering vinyl resin material to the surface of another body of material by a bond of a copolymer of butadiene and acrylonitrile.

It is an additional object of this invention to provide a new method for adhering a vinyl resin material to the surface of another body of material or to itself by means of a pressure-sensitive adhesive coating of a copolymer of butadiene and acrylonitrile.

We have discovered that an exceptionally strong bond is formed between vinyl resin material and the residue left from coating the resin material with a latex of a copolymer of butadiene and acrylonitrile.

We have made the further discovery that with particular modified latices of copolymers of butadiene and acrylonittrile, the residue of the latices on plasticized vinyl resin material, where the coating has been coagulated or otherwise changed to a translucent state by removal of water, develops a state persisting for a relatively long period in which it will adhere firmly to a similar coat of residue without the necessity of using great pressure to force them together or of maintaining pressure over the adhered surfaces. The modified latex possessing this property comprises dispersed butadiene-acrylonitrile copolymer in an aqueous phase comprising an agent or agents which increase the viscosity of the latex and which increase the period of self-adhesion during which the latex residue coat will adhere when pressed against a similar coat.

We have also made the surprising discovery that plasticized vinyl resin material will be adhered by maintaining it in contact with a freshly coagulated coating deposited from a modified latex of a copolymer of butadiene and acrylonitrile.

The term "latex" as employed in the specification and claims is to be understood in its usual sense as referring to a dispersion in an aqueous medium formed by polymerization of an aqueous emulsion of a monomer or mixture of monomers.

The vinyl resin material adhered according to the present invention may comprise a sheet or other section of a vinyl resin, such as polyvinyl acetate, polyvinyl chloride, copolymerized vinyl acetate and vinyl chloride, polyvinyl acetal, copolymerized vinyl chloride and vinylidene chloride, polymerized vinylidene chloride, or other suitable vinyl resins. Mixtures and copolymers of these and other vinyl resins are also contemplated. A preferred vinyl resin sheet comprises copolymerized vinyl acetate and vinyl chloride containing from about 80% to about 95% of vinyl chloride. Vinyl resin sheet material ordinarily contains a plasticizer. Suitable plasticizers for resins of the class adhered according to the present invention include ester type plasticizers such as dibutyl phthalate, dibutyl sebacate, tricresyl phosphate, and dioctyl phthalate.

As aqueous dispersions of butadiene-acrylonitrile copolymer, there may be used various commercial latices. "Perbunan G" and "Perbunan H," produced by Standard Oil Company of New Jersey, have been found useful and are emulsion copolymers of butadiene and acrylonitrile, the acrylonitrile constituting about 25% of the copolymer. Type "G" comprises about 50.1% copolymer solids and type "H" comprises about 55% copolymer solids. Other latices, such as "Hycar OR-15," which is produced by the Hycar Chemical Company of Akron, Ohio, and is also an emulsion copolymer of butadiene and acrylonitrile, may be used according to the present invention.

The modified butadiene-acrylonitrile copolymer latex for adhering vinyl resin materials, according to the present invention, may comprise known agents which thicken and improve the spreading of the latex on the vinyl resin material. Suitable agents for this purpose include ammonia-solubilized casein, wilkinite and bentonite.

Agents for use in the latex to increase the period of self-adhesion include highly soluble (i. e., at least about 20% in water) wetting agents possessing low detergent characteristics. Materials which have been found suitable are: "Naccosol A" (an alkyl aryl sulfonate sold by National Aniline Company, of New York, N. Y.), "Darvan #1" (a polymerized sodium naphthalene sulfonate produced by Dewey & Almy Chemical Company, of Cambridge, Mass.), "Tergitol #7" (a sulfonated alcohol produced by Carbide and Carbon Chemicals Corporation, New York, N. Y.), "Oronite" (a wetting agent sold by the Oronite Corporation, of San Francisco, California), and "Ultrawet" (an aromatic sodium sulfonate produced by the Atlantic Refining Company, Philadelphia, Pa.). These agents will be employed in amount from about 0.25% to about 8%, preferably about 1% to about 2% based upon the weight of the latex. The term "wetting agent" as used in the specification and claims refers to an agent for modifying the surface tension of the liquid, i. e. of the latex, and promoting better and more even wetting of waterproof sheet vinyl resin by the latex.

The latex employed is preferably an emulsion copolymer of butadiene and acrylonitrile in which the acrylonitrile is about 10% to about 50%, suitably about 25% by weight of the copolymer. Suitably the latex will comprise about 40% or more of the copolymer solids. Optionally, agents, e. g., sulphur, zinc oxide, and suitable accelerators, such as Butyl Zimate (zinc dibutyl dithio carbamate) or Butyl 8 (a rubber accelerator of the dithio carbamate type) for vulcanizing the copolymer, may be included in the latex or introduced into the emulsion immediately prior to use.

In accordance with one embodiment of our invention, a body of vinyl resin material is secured to another surface by coating the surface of the vinyl resin material and/or the other surface with a modified latex. Water is evaporated or otherwise removed, for example by absorption, from the latex. In the course of removal of water, a state is reached in which the milkiness of the latex disappears and a translucent, at least partially coagulated, film of residue remains. At this point it is found that the latex on a plasticized vinyl resin surface has developed self-adhesion or active adhesion characteristics such that if the residue-coated surface is pressed against a similar coated surface it will adhere immediately to that surface with appreciable strength and the bond thus formed will increase in strength to form a strong permanent union. It is also found that a residue coat on any surface, for example, a porous surface, while in this at least partially coagulated condition, will adhere to a plasticized vinyl resin which is maintained in contact with it for a period of time. For this last type of adhesion it is desirable to wash the vinyl resin with an organic solvent, such as naphtha or toluol, which will not soften or swell the resin. Methyl ethyl ketone may also be used.

This character of self-adhesion or active adhesion persists for a period which may be from one hour up to as much as twenty hours or more.

The persistence of the adhesion characteristic is dependent upon a number of factors including the quantity of ammonia-cut or ammonia-solubilized casein based on the weight of the copolymer of butadiene and acrylonitrile, the kind and quantity of wetting agent, and upon the humidity of the atmosphere.

In a modified form of the invention a relatively thick coating of butadiene-acrylonitrile latex is applied to the vinyl resin surface and, while the latex is still wet, the coated surface is brought into contact with a porous or bibulous surface which may or may not be coated with latex and maintained in contact with the surface until the emulsion has set.

The proprotions of thickening agent and wetting agent required to provide the desired characteristics in the latex depend upon the method of adhering which is to be employed. Where a coat of emulsion is to be applied to a surface and water evaporated or otherwise removed to develop the characteristic of self-adherence or active adherence, there will be employed from about 1% to about 8%, preferably about 3% to about 6%, of ammonia-cut, i. e. ammonia-solubilized, casein based on the weight of the butadiene-acrylonitrile copolymer present in the latex. A greater per cent of the casein will reduce adhesion to the vinyl resin and a smaller per cent will reduce the ability of the films to adhere when pressed together and will reduce the strength of the ultimate bond. It is important that no fixed alkali be employed in latex for this method. In the latex for this type of adhesion the wetting agent will be employed in quantity of from about 0.25 to about 8%, preferably about 2% to about 4%, based on the weight of the latex.

Where a single coating of latex is to be applied to the vinyl resin and adhesion accomplished by pressing the wet coating of latex against a porous or bibulous surface, there will be employed from about 1% to about 8%, preferably about 1% to about 2%, based on the weight of the butadiene-acrylonitrile copolymer present in the latex, of a thickening agent in order that a thick coating of the latex may be formed on the "Vinylite" surface.

In either of the two types of vinyl resin adhesion, the latex coating may be applied by spraying, brushing, dipping, or other convenient method.

The following examples are given to illustrate the invention only, and it is to be understood that the invention is not restricted to the specific proportions or ingredients disclosed in the examples.

*Example 1.*—100 parts by weight of Perbunan G latex containing 52% of butadiene-acrylonitrile copolymer was mixed with a solution comprising 10 parts by weight of a 9% ammonia-cut casein solution, 1.9 parts by weight of a 40% potassium hydroxide solution, and 6.3 parts by weight of a 37% formaldehyde solution. The mixture of latex and casein solution was a relatively thick and viscous paste having a viscosity of 50–100 Störmer using a 300 gram weight. The mixture of latex and casein solution was brushed on the surface of a plasticized "Vinylite VYNW" sheet and the coated sheet was pressed against a cotton cloth surface while the latex was wet. At the end of three hours, the "Vinylite" was found to adhere strongly to the cotton cloth. "Vinylite VYNW" is a copolymer of 95% vinyl chloride and 5% vinyl acetate produced by Carbide and Carbon Chemicals Corporation. It is understood that the "Vinylite" sheet is compounded to comprise 35% dioctyl phthalate, 0.5% Cosmos B. B. Black, and 1.5% lead stearate, the balance being the vinyl polymer.

*Example 2.*—100 parts of Perbunan G latex containing 52% solids was mixed with 30 parts by weight of a 9% ammonia-cut casein solution. 8 parts of 25% Naccosol A solution in water were added. 5 parts by weight of a 37% formaldehyde solution were incorporated to remove ammonia odor. The resulting latex was a relatively thin fluid having a viscosity of 43 Störmer with a 50 gram weight. This composition was sprayed over the surfaces of two sheets of plasticized "Vinylite VYNW" and the coating permitted to dry for 8 hours. The coated surfaces were then pressed together and adhered immediately. 1 inch strips of the bonded "Vinylite" exhibited at this time a peel pull of 8 pounds. At the end of three days the "Vinylite" sheets were adhered so strongly together that a stripping pull of 12 pounds was required to separate the 1 inch strips.

*Example 3.*—The modified latex of "Example 2" was sprayed on a wood surface and the coating permitted to dry until the film became translucent. A sheet of plasticized "Vinylite VYNW" was washed with naphtha, pressed into contact with the coated surface, and maintained in contact overnight. It was found that the "Vinylite" sheet was firmly adhered to the coated wood surface. 1 inch strips of the bonded "Vinylite" exhibited at this time a peel pull of from 7 to 10 pounds, averaging about 8 pounds.

While the invention has been illustrated by examples of adhesion of a vinyl resin material to cloth, to wood, and to itself, it will be understood that the invention is susceptible to use in many other relations. Thus, for example, the vinyl resin material may be adhered to a leather surface by coating either the vinyl resin surface or the leather surface or both surfaces with a latex compounded in accordance with the principles of the invention and thereafter pressing the vinyl resin and leather together.

It is to be understood, accordingly, that the invention is not restricted to the specific examples and proportions given in the specification but is limited only by the claims appended hereto.

Having described our invention, what we claim as new and desire to secure by Letters Patent of the United States is:

1. The method which comprises coating a surface of a sheet of waterproof plasticized vinyl resin with a composition which consists of an aqueous dispersion of copolymerized butadiene and acrylonitrile synthetic rubber in which the acrylonitrile is from 10% to 50% of the copolymer, said latex containing an agent which increases the viscosity of the dispersion and containing a wetting agent, and removing water from the dispersion.

2. A method of adhering the surface of a sheet of waterproof plasticized vinyl resin to a porous surface of a body without extraneous heat which comprises coating at least one of the surfaces to be adhered with a latex comprising an emulsion copolymer of butadiene and acrylonitrile synthetic rubber in which the acrylonitrile is from 10% to 50% of the copolymer, bringing the surfaces together, and removing water from the latex.

3. A method of adhering the surface of a sheet of waterproof plasticized vinyl resin to a porous surface of a second body without extraneous heat which comprises coating at least one of the surfaces to be adhered with a latex comprising an emulsion copolymer of butadiene and acrylonitrile synthetic rubber in which the acrylonitrile is from 10% to 50% of the copolymer, an agent which increases the viscosity of the latex, and a wetting agent, bringing the surfaces together and removing water from the latex.

4. The method of securing together the surface of a sheet of waterproof plasticized vinyl resin and a porous surface of a body which comprises coating at least one of the surfaces to be adhered with a synthetic rubber latex comprising an emulsion copolymer of butadiene and acrylonitrile in which the acrylonitrile is from 10% to 50% of the copolymer, from 0.25% to 8% of a highly water soluble sulfonated hydrocarbon wetting agent and from 1% to about 8% of a water soluble caseinate, bringing the surfaces together and removing water from the latex to coagulate it.

5. A method of adhering the surface of a sheet of waterproof plasticized vinyl resin to a surface of a porous body without extraneous heat which comprises coating both of the surfaces to be adhered with a synthetic rubber latex comprising at least about 40% by weight solids of an emulsion copolymer of butadiene and acrylonitrile in which the acrylonitrile is about 25% by weight of the copolymer, said latex containing from about 0.25% to about 8% of a highly water-soluble sulfonated hydrocarbon wetting agent and also containing from about 1% to about 8% of ammonium caseinate, evaporating water from the latex to coagulate it and bring it to a translucent condition adhesive toward butadiene acrylonitrile copolymer latex residues in the same condition, and pressing together the surfaces with latex residue coats thereon.

6. A method of adhering the surface of a sheet of waterproof vinyl resin plasticized with an ester plasticizer to a porous surface of a body without extraneous heat which comprises coating both of the surfaces to be adhered with a synthetic rubber latex comprising at least about 40% by weight solids of an emulsion copolymer of butadiene and acrylonitrile in which the acrylonitrile is about 25% by weight of the copolymer, said latex containing from about 2% to about 4% of a sulphonated alkylated aromatic wetting agent and also containing from about 3% to about 6% of ammonium caseinate, evaporating water from the latex coat until the coat becomes translucent and adhesive toward butadiene acrylonitrile copolymer latex residues in the same condition, and pressing together the surfaces with latex residue coats thereon.

7. A method of adhering the surface of a sheet of waterproof plasticized vinyl resin to a porous surface of a body without extraneous heat which comprises washing the surface of the plasticized vinyl resin sheet with an organic solvent which will not soften or swell the resin, coating the surface of the body with a synthetic rubber latex comprising an emulsion copolymer of butadiene and acrylonitrile in which the acrylonitrile is from 10% to 50% of the copolymer, said latex containing from about 0.25% to about 8% of a highly water-soluble sulfonated hydrocarbon wetting agent and also containing about 1% to about 8% of ammonium caseinate, evaporating water from the latex to coagulate it and bring it to a translucent condition adhesive toward plasticized vinyl resin, and pressing the washed vinyl resin sheet against the latex residue coat.

8. A method of adhering the surface of a sheet of waterproof vinyl resin plasticized with an ester plasticizer to a porous surface of a body without extraneous heat which comprises washing the surface of the vinyl resin sheet with a non-swelling solvent from the group consisting of naphtha, toluol and methyl ethyl ketone, coating the surface of the body with a synthetic rubber latex comprising at least about 40% by weight solids of an emulsion copolymer of butadiene and acrylonitrile in which the acrylonitrile is about 25% by weight of the copolymer, said latex containing from about 2% to about 4% of a sulphonated alkylated aromatic wetting agent and also containing from about 3% to about 6% of ammonium caseinate, evaporating water from the latex coat until the coat becomes translucent and adhesive toward the vinyl resin, and pressing the surface of the vinyl resin sheet against the latex residue coat.

9. The method of securing together the surface of a sheet of waterproof plasticized vinyl resin and a porous surface of a body which comprises coating at least one of the surfaces to be adhered with a synthetic rubber latex comprising an emulsion copolymer of butadiene and acrylonitrile in which the acrylonitrile is from 10% to 50% of the copolymer, from 0.25% to 8% of a highly water soluble sulfonated hydrocarbon wetting agent and from 1% to 8% of a thickening agent for the latex, bringing the surfaces together and removing water from the latex to coagulate it.

10. A method of laminating without extraneous heat a sheet of ester plasticized with a layer of a synthetic rubber copolymer of butadiene and acrylonitrile which comprises washing the surface of the vinyl resin sheet with an organic solvent which will not soften or swell the resin, forming a layer of a copolymer of butadiene acrylonitrile copolymer by coating a second surface with a synthetic rubber latex comprising an emulsion copolymer of butadiene and acrylonitrile synthetic rubber in which the acrylonitrile is from 10% to 50% of the copolymer, said latex containing an agent which increases the viscosity of the latex, and a wetting agent, removing water from the latex to coagulate it and bring it to a translucent condition adhesive toward plasticized vinyl resin and pressing the washed vinyl resin sheet against the latex residue layer.

11. A method of laminating without extraneous heat a sheet of ester plasticized with a layer of a synthetic rubber copolymer of butadiene and acrylonitrile which comprises washing the surface of the vinyl resin sheet with an organic solvent which will not soften or swell the resin, forming a layer of a copolymer of butadiene acrylonitrile copolymer by coating a second surface with a synthetic rubber latex comprising an emulsion copolymer of butadiene and acrylonitrile synthetic rubber in which the acrylonitrile is from 10% to 50% of the copolymer, said latex containing from 1% to 8% of ammonium caseinate, and from 0.25% to 8% of a highly water-soluble sulfonated hydrocarbon wetting agent, removing water from the latex to coagulate it and bring it to a translucent condition adhesive toward plasticized vinyl resin and pressing the washed vinyl resin sheet against the latex residue layer.

12. A method of adhering without extraneous heat a sheet of ester plasticized to a second sheet of ester plasticized waterproof vinyl resin which comprises washing the surface of the first-mentioned vinyl resin sheet with an organic solvent which will not soften or swell the resin, coating the surface of the second sheet with a synthetic rubber latex comprising an emulsion copolymer of butadiene and acrylonitrile synthetic rubber in which the acrylonitrile is from 10% to 50% of the copolymer, said latex containing from 1% to 8% of ammonium caseinate and from 0.25% to 8% of a highly water-soluble sulfonated hydrocarbon wetting agent, removing water from the latex to coagulate it and bring it to a translucent condition adhesive toward plasticized vinyl resin and pressing the washed vinyl resin sheet against the latex residue coat.

THOMAS C. MORRIS.
ERIC C. JOHNSON.

REFERENCES CITED

The following references are of record in the file of this patent:

UNITED STATES PATENTS

| Number | Name | Date |
|---|---|---|
| 2,040,608 | Hinrichs | May 12, 1936 |
| 2,271,124 | Juve et al. | Jan. 27, 1942 |
| 2,278,777 | Garvey et al. | Apr. 7, 1942 |
| 2,323,562 | Nugent | July 6, 1943 |
| 2,343,095 | Smith | Feb. 29, 1944 |
| 2,393,438 | Weisberg et al. | Jan. 22, 1946 |
| 2,403,313 | Taylor | July 2, 1946 |
| 2,416,232 | Soday | Feb. 18, 1947 |
| 2,427,519 | Blyler | Sept. 16, 1947 |

FOREIGN PATENTS

| Number | Country | Date |
|---|---|---|
| 542,331 | Great Britain | Jan. 5, 1942 |
| 560,778 | Great Britain | Apr. 20, 1944 |

OTHER REFERENCES

Hycar Synthetic Rubber, "Blue Book," trade publication, Goodrich Chemical Company, Cleveland, Ohio, copyright 1944, sections I to VII; pages cited—Sec. VI, group A, page 1.